US012625371B2

(12) United States Patent
Grimwood

(10) Patent No.: US 12,625,371 B2
(45) Date of Patent: May 12, 2026

(54) PROJECTOR COMPRISING A VARIABLE APERTURE ASSEMBLY THAT CAN MOVE LATERALLY ALONG AN OPTICAL AXIS AND ROTATE WITH RESPECT TO THE OPTICAL AXIS

(71) Applicant: BAE SYSTEMS plc, London (GB)

(72) Inventor: Darren Neil Grimwood, Rochester (GB)

(73) Assignee: BAE SYSTEMS PLC, London (GB)

( * ) Notice: Subject to any disclaimer, the term of this patent is extended or adjusted under 35 U.S.C. 154(b) by 307 days.

(21) Appl. No.: 18/553,299

(22) PCT Filed: Mar. 21, 2022

(86) PCT No.: PCT/GB2022/050705
§ 371 (c)(1),
(2) Date: Sep. 29, 2023

(87) PCT Pub. No.: WO2022/208051
PCT Pub. Date: Oct. 6, 2022

(65) Prior Publication Data
US 2024/0210703 A1 Jun. 27, 2024

(30) Foreign Application Priority Data

Mar. 30, 2021 (EP) .................................... 21275036
Mar. 30, 2021 (GB) .................................... 2104531

(51) Int. Cl.
*G02B 27/01* (2006.01)
(52) U.S. Cl.
CPC .. *G02B 27/0172* (2013.01); *G02B 2027/0118* (2013.01); *G02B 2207/101* (2013.01)

(58) Field of Classification Search
CPC .............................................. G02B 2207/101
See application file for complete search history.

(56) References Cited

U.S. PATENT DOCUMENTS 4,805,988 A      2/1989   Dones
2003/0063264 A1  4/2003   Watanabe et al.
(Continued)

FOREIGN PATENT DOCUMENTS

CN      112099230 A      12/2020
JP      H04113344 A      4/1992
(Continued)

OTHER PUBLICATIONS

GB Search Report received for GB Application No. 2104531.5, dated Jan. 11, 2022. 8 pages.
(Continued)

*Primary Examiner* — Paul C Lee
(74) *Attorney, Agent, or Firm* — Arcane Law PLLC

(57) ABSTRACT

A projector for use in a head-up or head-worn display is described. The projector comprises a display source, an output screen, and a variable aperture assembly. The variable aperture assembly is positioned on an optical axis between the display source and the output screen and is adjustable to change a geometry (e.g. size and/or shape) of an aperture that is aligned with the optical axis and thereby change the efficiency of the optical train of the projector. The geometry that is changed may be a physical geometry or an effective geometry.

22 Claims, 5 Drawing Sheets

(56)     References Cited

U.S. PATENT DOCUMENTS

| | | | |
|---|---|---|---|
| 2014/0210802 A1 | 7/2014 | Myers et al. | |
| 2015/0205133 A1 * | 7/2015 | Sasaki et al. | |
| 2017/0139181 A1 * | 5/2017 | Du | G02B 7/006 |
| 2019/0346679 A1 | 11/2019 | Miller | |
| 2020/0371360 A1 | 11/2020 | Dalrymple et al. | |

FOREIGN PATENT DOCUMENTS

| | | | | |
|---|---|---|---|---|
| JP | H07199183 A | | 8/1995 | |
| JP | H10339852 A | | 12/1998 | |
| JP | 2932645 B2 | * | 8/1999 | |
| JP | 2001177851 A | | 6/2001 | |
| JP | 2010039030 A | * | 2/2010 | G02B 26/02 |
| JP | 2020154027 A | * | 9/2020 | |
| WO | WO-03028074 A1 | * | 4/2003 | G03F 7/70091 |
| WO | WO-2020166268 A1 | * | 8/2020 | B60K 35/60 |
| WO | 2022208051 A1 | | 10/2022 | |

OTHER PUBLICATIONS

Extended European Search Report received for EP Application No. 21275036.8, dated Sep. 24, 2021. 8 pages.
International Search Report and Written Opinion received for PCT Application No. PCT/GB2022/050705, dated Jun. 20, 2022. 13 pages.

* cited by examiner

1

PROJECTOR COMPRISING A VARIABLE APERTURE ASSEMBLY THAT CAN MOVE LATERALLY ALONG AN OPTICAL AXIS AND ROTATE WITH RESPECT TO THE OPTICAL AXIS

TECHNICAL FIELD

The present invention relates to an improved projector and in particular to an improved projector for use in a head-up display (HUD) or head-worn (or head-mounted) display.

BACKGROUND

A head-up display (HUD) is a transparent display device that presents data and or images to a user without requiring the user to look away from the scene they are viewing. For example, a HUD may be used by an aircraft pilot to receive images and data from various sources whilst viewing their normal field of view, either naturally or via an imaging device.

A head-worn display (or head-mounted display, HMD) is a different type transparent display device that presents data and or images to a user without requiring the user to look away from the scene they are viewing. A head-worn display may, for example, be integrated in a helmet. The helmet may be worn by an aircraft pilot, for example, and used to receive images and data from various sources whilst viewing their normal field of view. The helmet may alternatively be worn in other situations, e.g. on a boat/ship, in a land-based vehicle, etc. In another example, the head-worn display may be in the form of glasses or other form-factor.

Both HUDs and head-worn displays include a device that generates the image viewed by the user. In older designs, the image was generated using CRT technology; however, these devices are now being replaced with DLE (digital light engine) projectors which include an electro-optic light source (e.g. LEDs) and are much smaller and lighter. Such a projector may, for example, be a DLE (digital light engine) projector or may use other technologies, such as LCDs.

The embodiments described below are not limited to implementations which solve any or all of the disadvantages of known head-up or head-worn displays.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A projector for use in a head-up or head-worn display is described. The projector comprises a display source, an output screen, and a variable aperture assembly. The variable aperture assembly is positioned on an optical axis between the display source and the output screen and is adjustable to change a geometry (e.g. size and/or shape) of an aperture that is aligned with the optical axis and thereby change the efficiency of the optical train of the projector. The geometry that is changed may be a physical geometry or an effective geometry.

A first aspect provides a projector for use in a head-up or head-worn display, the projector comprising: a display source; an output screen; and a variable aperture assembly positioned on an optical axis between the display source and the output screen and wherein the variable aperture assembly is adjustable to change a physical or an effective geometry of an aperture that is aligned with the optical axis.

The projector may further comprise an aperture actuator mechanism coupled to the variable aperture assembly and operable to change the geometry of an aperture that is aligned with the optical axis.

The variable aperture assembly may be adjustable to change the physical geometry of the aperture. The geometry of an aperture may comprise the size of an aperture. The geometry of an aperture may comprise the shape of an aperture.

The variable aperture assembly may comprise a plate with a plurality of apertures of different geometries in the plate. The plate may comprise two apertures of different sizes. The plate may comprise three apertures of different sizes. The aperture actuator mechanism may be operable to move the plate between two or more pre-set positions, wherein in each pre-set position a different one of the plurality of apertures is aligned with the optical axis. The motion may be a lateral motion. The motion may be a rotation.

The variable aperture assembly may comprise a plate having an opening and a second member and wherein the aperture actuator mechanism is operable to move the second member relative to the plate, wherein moving the second member changes the geometry of the aperture.

The variable aperture assembly may comprise a plate with a variable geometry aperture in the plate. The aperture actuator mechanism may be operable to change the geometry of the variable geometry aperture.

The aperture actuator mechanism may be operable to move the variable aperture assembly along the optical axis.

The projector may have a first mode of operation wherein the variable aperture assembly is adjusted to a first aperture size and a second mode of operation wherein the variable aperture assembly is adjusted to a second aperture size and wherein the first aperture size is smaller than the second aperture size. The projector may be operable to switch between the first mode and the second mode of operation in response to an input signal. The input signal may be received from a switch or button. The input signal may be received from an ambient light level sensing system. The projector may be operable to switch to the first mode of operation in response to an input signal indicating an ambient light level below a first pre-defined threshold. The projector may be operable to switch to the second mode of operation in response to an input signal indicating an ambient light level above a second pre-defined threshold.

A second aspect provides a head-up display comprising the projector according to the first aspect.

A third aspect provides a head-worn display comprising the projector according to the first aspect.

A fourth aspect provides a method of operating a projector for use in a head-up or head-worn display, the projector comprising a display source, an output screen and a variable aperture assembly positioned on an optical axis between the display source and the output screen and wherein the method comprises: receiving an input signal; and adjusting, based on the input signal, the variable aperture assembly to change a physical or an effective geometry of an aperture that is aligned with the optical axis.

The input signal may be an ambient light level and wherein adjusting, based on the input signal, the variable aperture assembly to change the geometry of an aperture that is aligned with the optical axis, comprises: comparing the input signal to one or more pre-defined thresholds; and adjusting, based on the comparison, the variable aperture assembly to change the geometry of an aperture that is aligned with the optical axis.

The preferred features may be combined as appropriate, as would be apparent to a skilled person, and may be combined with any of the aspects of the invention.

DESCRIPTION OF THE DRAWINGS

Embodiments of the invention will be described, by way of example, with reference to the following drawings, in which.

Figure 1:
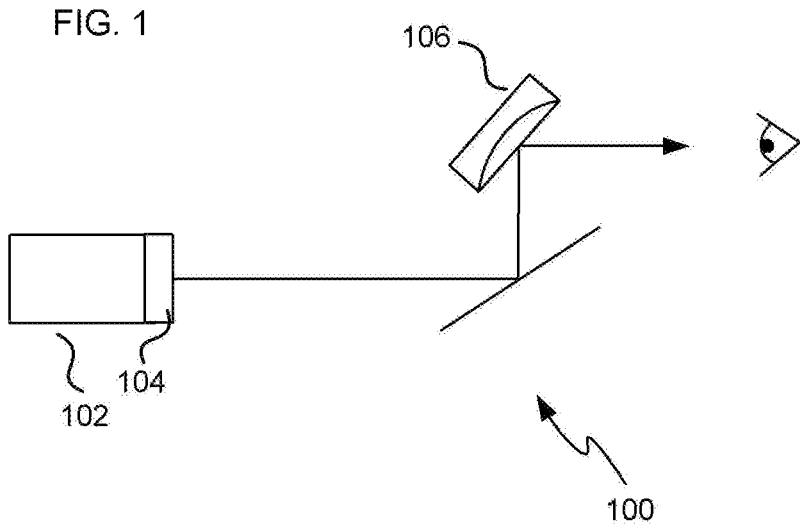
FIG. 1 is a schematic diagram of an example head-up display.

Common reference numerals are used throughout the figures to indicate similar features.

DESCRIPTION OF THE INVENTION

Head-up displays and/or head-worn displays may be designed for use in environments where there is a huge range in ambient light conditions. For example, at one extreme when in an aircraft above the clouds in daytime and in the other extreme when in an aircraft on a night when there is no visible moon. The difference in brightness levels between these two extremes may be of the order of $10^4$ or $10^5$ or greater. For safety reasons it is important that the head-up display and/or head-worn display does not impair a pilot's vision in any conditions and to operate effectively, the data or images projected by the head-up display and/or head-worn display need to be visible irrespective of the ambient light level, whilst not hindering the simultaneous view of the outside world.

Figure 2:
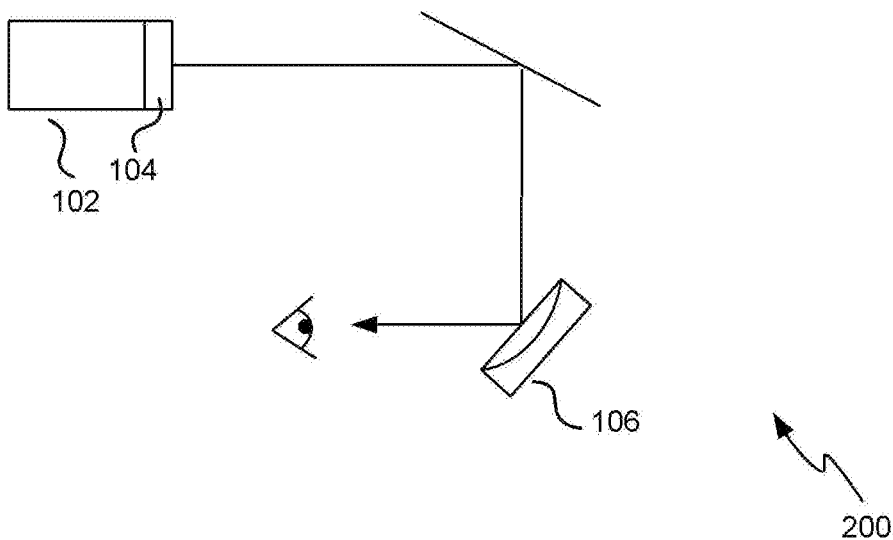
FIG. 2 is a schematic diagram of an example head-worn display.

FIG. 1 shows an example head-up display 100 which comprises a projector 102 (e.g. a digital light projector) and collimating optics 106. It will be appreciated that a head-up display may comprise additional elements not shown in FIG. 1. The projector 102 may emit light of any suitable wavelength. Light emitted by the light source within the projector 102 is focused on the diffuser (or output) screen 104 of the projector 102. The light passes through the diffuser (or output) screen 104 and the collimating optics 106 and is incident on a viewer's eyes if the eyes are positioned appropriately. Light that is emitted by the projector 102 but which is not incident on the collimating optics 106 (e.g. because of the angle of the rays) does not reach the viewer. FIG. 2 shows an example head-worn display 200 which comprises similar optical elements to those in a head-up display (as shown in FIG. 1), but in a slightly different configuration.

Described herein is an improved projector assembly for use in a head-up display or a head-worn display. The improved projector assembly described herein provides improved performance (e.g. in terms of contrast, thermal considerations, drive circuitry, etc.) particularly where used in applications where there is a huge range in ambient light conditions, e.g. for head-up displays in aircraft and head-worn displays worn by pilots (and/or other aircrew).

Figure 3:
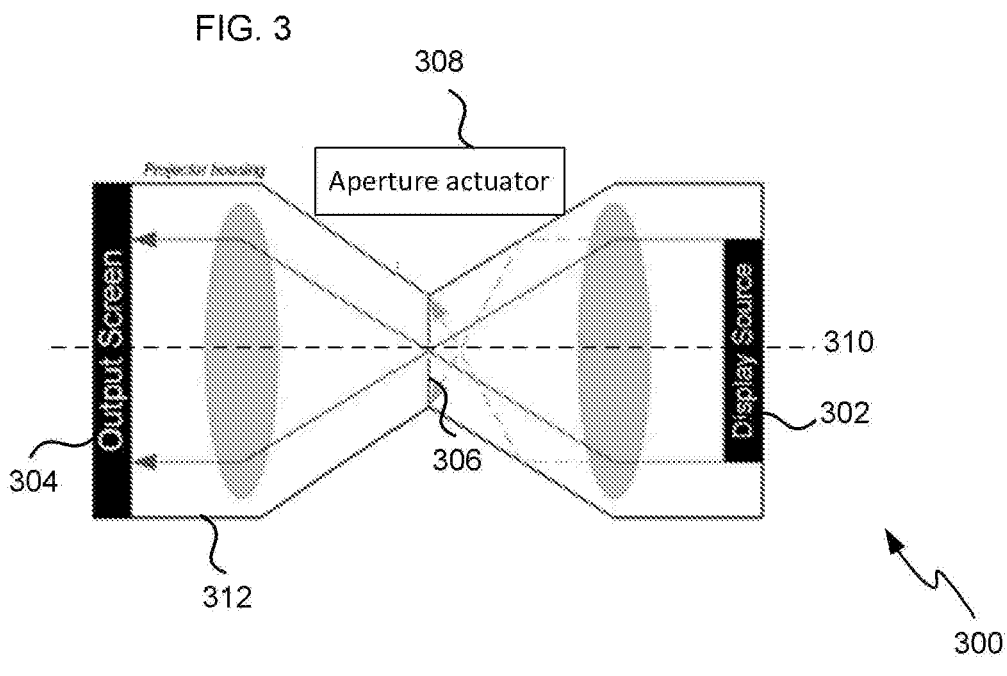
FIG. 3 is a schematic diagram of an improved projector which may be used in the head-up display of FIG. 1 or the head-worn display of FIG. 2.

FIG. 3 shows a schematic diagram of an improved projector 300 which may be used in the head-up display 100 of FIG. 1 or the head-worn display 200 of FIG. 2. The projector 300 comprises a display source 302, an output screen 304 (which corresponds to the screen 104 shown in FIGS. 1 and 2) and a variable aperture assembly 306 positioned between the source 302 and the screen 304. The projector 300 also comprises an aperture actuator mechanism 308 that is coupled to the variable aperture assembly 306. The aperture actuator mechanism 308 is arranged to actuate the variable aperture assembly 306 to change the physical or effective geometry (e.g. size and/or shape) of the aperture which is aligned with the optical axis 310 of the projector and hence change (e.g. increase or decrease) the amount of light passing through the aperture assembly 306. The elements are contained within a housing 312 and it will be appreciated that a projector 300 may comprise additional elements not shown in FIG. 3.

As shown in FIG. 3, the optical axis passes through the centre of the aperture and through both the display source 302 and output screen 304. Whilst FIG. 3 shows the optical axis 310 as a single straight line, it will be appreciated that in other arrangements the projector 300 may additionally comprise one or more mirrors or other optical elements that change the direction of the light output by the display source 302 and hence the optical axis 310 may also change direction at these optical elements.

The aperture actuator mechanism 308 may actuate the variable aperture assembly 306 to change the physical geometry (e.g. physical size and/or shape) of the aperture which is aligned with the optical axis 310 and various examples are described below (e.g. with reference to figures 408). In addition, or instead, the aperture actuator mechanism 308 may actuate the variable aperture assembly 306 to change the effective geometry of the aperture by moving the variable aperture assembly 306 axially (i.e. along the optical axis 310).

Figure 6:
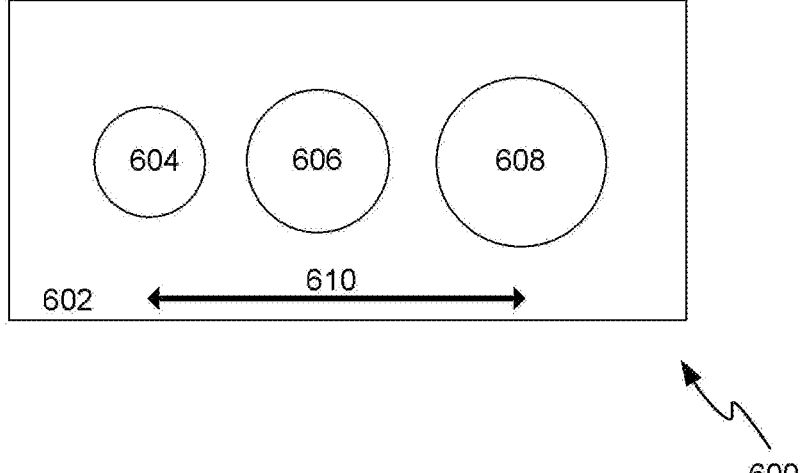
Figure 7:
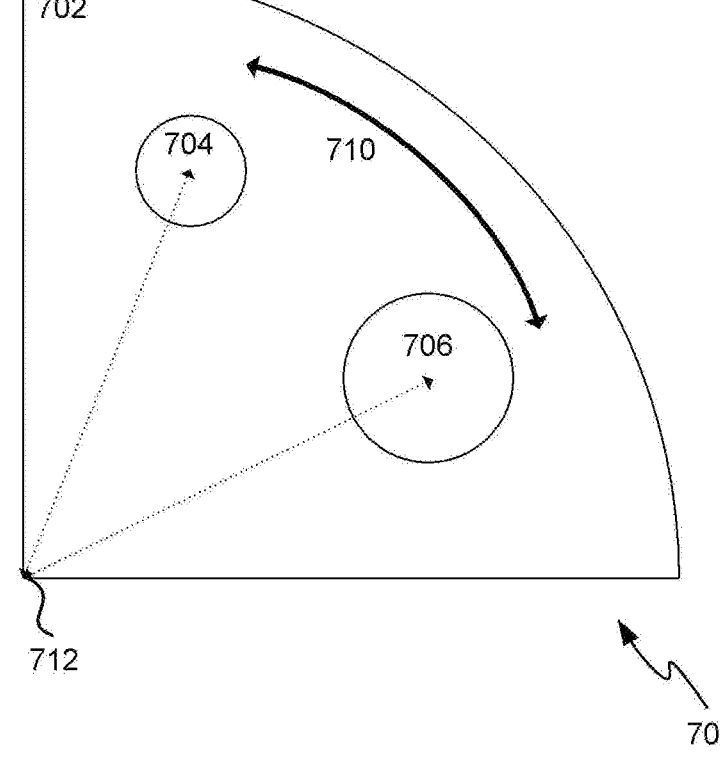
Figure 8:
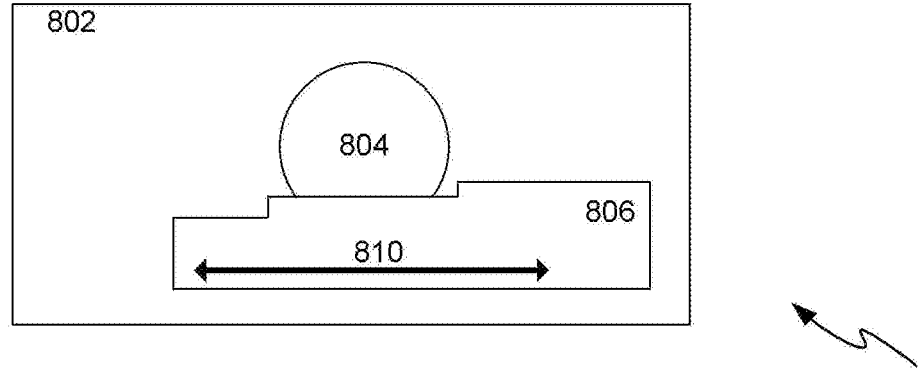
Figure 9:
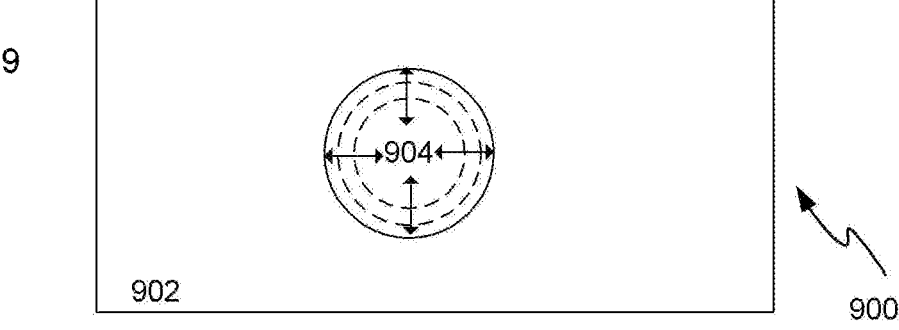

The variable aperture assembly 306 may comprise a plurality of apertures of different geometries (e.g. different sizes and/or shapes), as shown in FIGS. 4-7 and/or may comprise an adjustable opening as shown in FIG. 9. In further examples, the variable aperture assembly 306 may comprise a different arrangement of elements to provide an aperture with geometry that can be changed to adjust the amount of light passing through the aperture, e.g. one or more movable opaque elements that slide in front of the opening and adjust the size and/or shape of the aperture as shown in FIG. 8. Where the variable aperture assembly 306 comprises a plurality of apertures, the aperture actuator 308 is arranged to move the assembly 306 between different pre-set positions, where in each one of the pre-set positions a different aperture of the plurality of apertures is aligned with the optical axis 310. Where the variable aperture assembly 306 comprises an adjustable opening, the aperture actuator 308 is arranged to change the size (e.g. diameter) of the adjustable circular opening (which remains aligned with the optical axis 310). Where the variable aperture assembly 306 comprises a fixed opening and movable elements in front of or behind the opening, the aperture actuator 308 is arranged to move the movable elements relative to the fixed opening to change the size (e.g. diameter) and/or shape of the aperture (which remains aligned with the optical axis 310).

Figure 4:
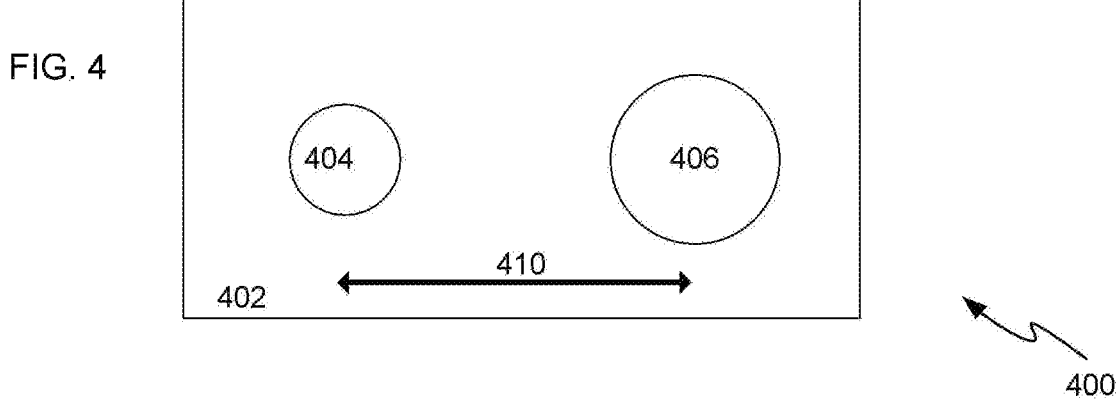
FIG. 4-9 show example variable aperture assemblies.
Figure 5:
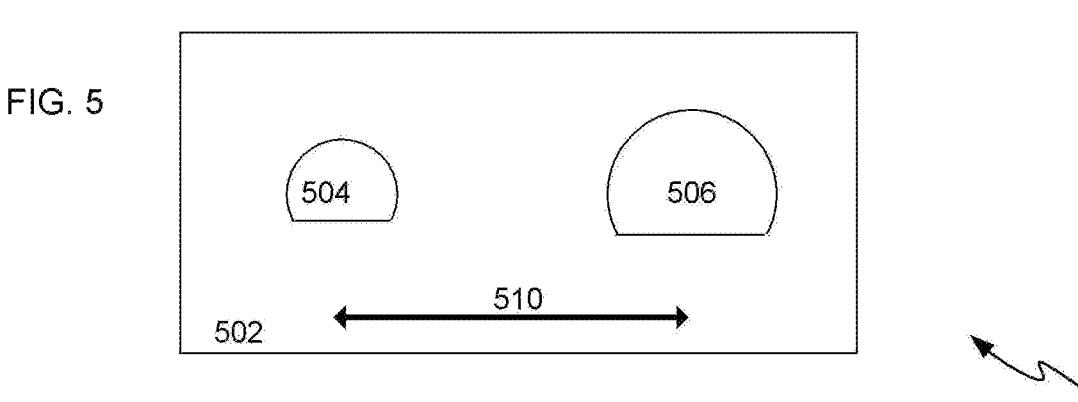

The variable aperture assemblies 400, 500 shown in FIGS. 4 and 5 comprise a plate 402, 502 (or other structure)

with two different apertures 404, 406, 504, 506 in it. In the example shown in FIG. 4, the two apertures 404, 406 are both circular but have different diameters and in the example shown in FIG. 5, the two apertures 504, 506 are both D-shaped but of different sizes. In other examples, the apertures may be of a different shape to that shown in FIGS. 4 and 5 and/or instead of the two apertures in the plate being the same shape but different sizes, the two apertures in the plate may be of a different shape to each other (and optionally also of different sizes). The aperture actuator 308 is arranged to move the assembly 400, 500 between a first position where a first aperture (e.g. smaller aperture 404, 504) is aligned with the optical axis 310 of the projector and a second position where a second aperture (e.g. larger aperture 406, 506) is aligned with the optical axis 310 of the projector. The motion of the assembly 400 (as indicated by arrows 410, 510 in FIGS. 4 and 5) may be perpendicular to the optical axis, e.g. with reference to the orientation of the projector 300 shown in FIG. 3, the motion may be vertical or into and out of the plane of the drawing.

The variable aperture assembly 600 shown in FIG. 6 is similar to that shown in FIG. 4 but comprises three, rather than two, apertures. The variable aperture assembly 600 comprises a plate 602 (or other structure) with three circular apertures 604, 606, 608 of different diameters in it. The aperture actuator 308 is arranged to move the assembly 600 between a first position where a first aperture (e.g. smallest aperture 604) is aligned with the optical axis 310 of the projector, a second position where a second aperture (e.g. mid-sized aperture 606) is aligned with the optical axis 310 of the projector and a third position where a third aperture (e.g. largest aperture 608) is aligned with the optical axis 310 of the projector. Again, the motion (as indicated by arrow 610 in FIG. 6) is perpendicular to the optical axis. Whilst the apertures shown in FIG. 6 are circular, this is by way of example only and the apertures may have a different shape (e.g. D-shaped as in FIG. 5 or any other shape).

Whilst FIGS. 4-6 show linearly arranged apertures such that the aperture actuator is arranged to move the variable aperture assembly 400, 500, 600 in a linear movement (as indicated by arrows 410, 510, 610), in other examples, the apertures may be differently arranged. FIG. 7 shows such an example of a variable aperture assembly 700 in which the apertures 704, 706 in the plate 702 are arranged radially (i.e. such that the centre of each aperture is the same distance from the pivot 712) and the aperture actuator is arranged to rotate the variable aperture assembly 700 (as indicated by arrow 710) around a pivot point 712 between pre-set positions in which an aperture 704, 706 is aligned with the optical axis 310 of the projector. Whilst the example in FIG. 7 shows a plate 702 which is a segment of a circle, in other examples the plate may be circular and there may be two or more apertures in the plate. Furthermore, whilst the apertures shown in FIG. 7 are circular, this is by way of example only and the apertures may have a different shape (e.g. D-shaped as in FIG. 5 or any other shape).

The variable aperture assembly 800 shown in FIG. 8 comprises a plate 802 with a single opening 804 in it. The size of the aperture may be varied by sliding a second member 806 relative to the plate 802 (as indicated by the arrow 810 in FIG. 8). In the example shown, the second member 804 comprises a stepped edge and dependent upon which edge is aligned with the opening 804, the geometry of the aperture (formed by the combination of the opening 804 in the plate 802 and the second member 804) is changed. As described above, in this example the aperture actuator 308 is arranged to change the geometry (e.g. size) of the aperture whilst the centre of the aperture remains aligned with the optical axis 310 and in this example, the plate 802 does not move. Whilst the aperture shown in FIG. 8 is D-shaped, this is by way of example only and the resulting aperture formed from the combination of the opening 804 in the plate 802 and the second member 804 may have a different shape.

The variable aperture assembly 900 shown in FIG. 9 comprises a plate 902 with a variable size aperture 904 in it. The size of the aperture may be varied in a continuous manner (e.g. between a minimum and a maximum diameter) or there may be a plurality of pre-set sizes for the aperture 904 (e.g. as indicated by the dotted circles in FIG. 9). As described above, in this example the aperture actuator 308 is arranged to change the size (e.g. diameter) of the adjustable circular opening (as indicated by the arrows in FIG. 9) whilst the centre of the aperture 904 remains aligned with the optical axis 310. Whilst the aperture shown in FIG. 9 is circular, this is by way of example only and the aperture may have a different shape (e.g. D-shaped as in FIG. 5 or any other shape).

In the examples described above with reference to FIGS. 4-9, the aperture actuator 308 is arranged to change the size of the aperture but not the shape. In other examples, however, the aperture actuator 308 may change the shape of the aperture (e.g. by moving a plate which comprises apertures of different shapes, in a similar manner to FIGS. 4-7 described above, by moving a second element relative to the plate which changes the shape of the aperture depending upon its alignment with the opening in the plate in a similar manner to FIG. 8 or by closing/opening the aperture and adjusting its shape in a similar manner to FIG. 9).

The use of an improved projector 300 as described above provides the ability to vary the size of the aperture within the projector and hence the amount of light that is output by the projector 300 (via the output screen 304). By selecting a smaller aperture in low ambient light conditions and a larger aperture in high ambient light conditions, the overall performance of the head-up display or head-worn display is improved.

With a fixed aperture size, as in known systems, and low ambient light conditions (e.g. at night) to avoid light leakage in areas where data/images are not projected (i.e. those parts that are black on the display source) which would impair a user's vision (and reduce safety), it is necessary to drive the display source at very low levels (e.g. to provide low output light emission) and this results in complex drive electronics for the display source. In contrast, using the improved projector 300, the smallest aperture size can be selected, thereby reducing the efficiency of the optical train within the projector. This reduces the amount of light output by the projector (compared to a larger aperture size), improves contrast and avoids the need for very low luminance drive signals (which may necessitate complex drive electronics) as well as reducing the likelihood of light leakage impairing a user's vision.

With a fixed aperture size, as in known systems, and high ambient light conditions (e.g. in the daytime above the clouds) to obtain the required output brightness levels so that the data/images that are projected are visible against the background scene, it is necessary to drive the display source at very high levels (e.g. to provide high output light emission). This results in thermal issues (because the electronics gets hot) and can affect component reliability and device safety. In contrast, using the improved projector 300, the largest aperture size can be selected, thereby increasing the efficiency of the optical train within the projector. This increases the light output by the projector (compared to a smaller aperture size) and avoids the need for very high drive voltages. Use of a larger aperture may reduce contrast (compared to use of a smaller aperture) but this does not impact overall performance in high ambient light levels.

Use of a variable aperture assembly comprising a plurality of different sized and/or shaped apertures (as shown in FIGS. 4-7) or a movable second element (in combination with a fixed plate, as shown in FIG. 8) results in an actuator mechanism which is more robust and less complex since there are fewer moving parts. This may result in increased reliability compared to a more complex arrangement (e.g. with an aperture that changes size and/or shape, as in FIG. 9), particularly in harsh environments (e.g. on an aircraft where the projector will be subject to high levels of vibrations at some points in its operation).

Where the variable aperture assembly comprises two apertures of different sizes (and which may be of the same or different shape), or where the aperture can be adjust to two different sizes (again where the shape may be the same or different), the smaller one may be selected and used in low ambient light conditions and the larger one may be selected and used in high ambient light conditions. The projector 300 (and hence the head-up or head-worn display) may therefore have two modes of operation (e.g. a night mode and a day mode) and the aperture actuator 308 may switch between apertures or adjust the aperture size to switch between the two operating modes.

Where the variable aperture assembly comprises more than two apertures of different sizes, or where the aperture can be adjust to more than two different sizes, the projector 300 (and hence the head-up or head-worn display) may have more than two modes of operation (e.g. one per available aperture size). For example, the projector may have a third mode of operation in which an intermediate size aperture is selected or the aperture is adjusted to an intermediate size, and this may be used for intermediate ambient light levels (e.g. at dawn and dusk).

In the examples described above with reference to FIGS. 4-9, the aperture actuator mechanism 308 actuates the variable aperture assembly 306 to change the physical geometry (e.g. physical size and/or shape) of the aperture which is aligned with the optical axis 310. As detailed above, in addition to this, or instead of this, the effective aperture size may be varied by moving the variable aperture assembly 306 axially, i.e. along the optical axis 310 closer to the display source 310 or output screen 304, as shown in FIG. 11.

Figure 11:
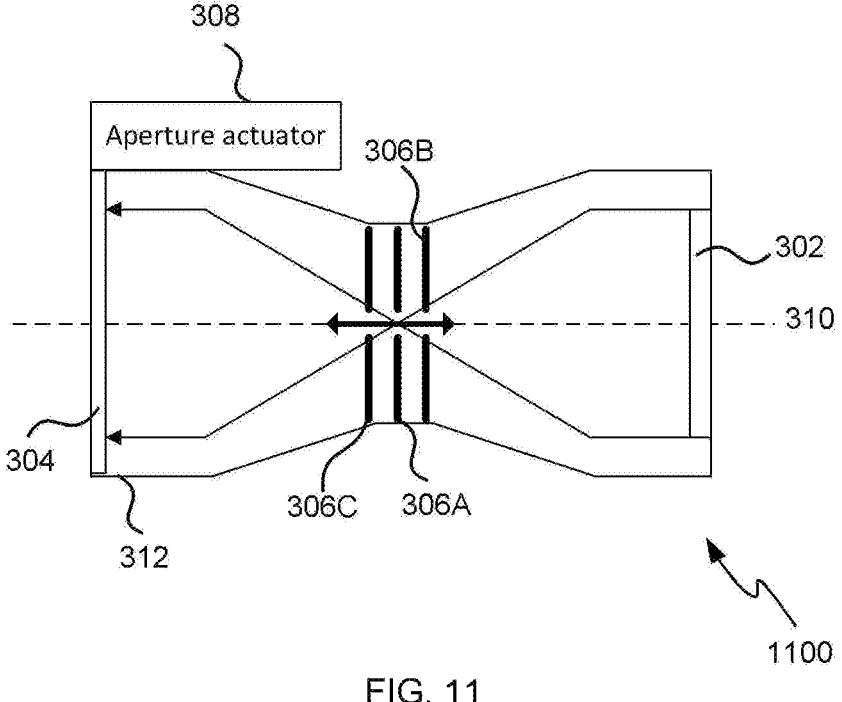
FIG. 11 is a schematic diagram of another improved projector which may be used in the head-up display of FIG. 1 or the head-worn display of FIG. 2.

FIG. 11 shows a schematic diagram of an improved projector 1100 which may be used in the head-up display 100 of FIG. 1 or the head-worn display 200 of FIG. 2. The projector 1100 shown in FIG. 11 is a variation of that shown in FIG. 3 and described above and so the different elements are not described again here. As shown in FIG. 11, the aperture actuator mechanism 308 is arranged to move the variable aperture assembly 306 from a central position 306A along the optical axis 310 towards the display source 302 (e.g. to position 306B) or towards the output screen 304 (e.g. to position 306C), as indicated by the arrow in FIG. 11.

The term 'effective aperture size' in this context refers to the fact that by moving the aperture axially, without changing the physical geometry, the same optical effect can be achieved as by changing the physical geometry of an aperture located at a fixed position (e.g. position 306A) along the optical axis.

Figure 10:
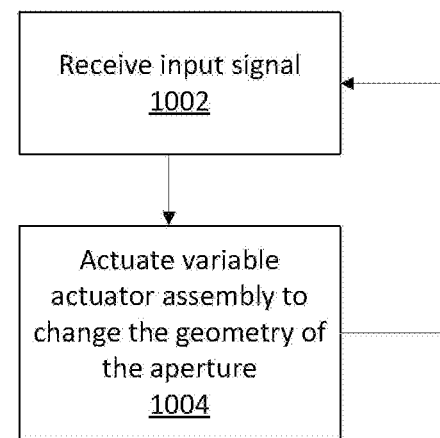
FIG. 10 is a flow diagram of an example method of operation of the projector of FIG. 3.

FIG. 10 is a flow diagram showing a method of operation of the aperture actuator mechanism 308. As shown in FIG. 10, the aperture actuator mechanism receives a trigger signal (block 1002) and in response actuates the variable aperture assembly to change the geometry (e.g. size and/or shape) of the aperture based on the trigger signal (block 1004). As described above, changing the geometry (e.g. size and/or shape) of the aperture may comprise moving the plate of the variable aperture assembly so that an aperture of a different size is aligned with the optical axis 310 of the projector (e.g. as in the examples of FIGS. 4-7), moving a second element relative to the plate (e.g. as in the example of FIG. 8) or may comprise opening or closing the aperture to change its geometry (e.g. as in the example of FIG. 9). It may, in addition or instead, comprise moving the variable aperture assembly axially (e.g. as in the example of FIG. 11). The trigger signal may for example specify a mode of operation (e.g. night/day/twilight), an aperture selection (e.g. aperture 404 or 406) or an aperture geometry (e.g. size and/or shape). In other examples the trigger signal may cause the projector to toggle between the different modes of operation (e.g. such that the trigger signal triggers selection of a next mode in a pre-defined sequence of modes, e.g. night-day-night, etc. or night-twilight-day-twilight-night, etc.).

The trigger signal that is received (in block 1002) may be generated in any way and received from any source. The signal may be generated in response to a user input, e.g. via a button or switch on the head-up or head-worn display or in the console of an aircraft in which the display is used or installed. The signal may be generated by a sensing system, such as an ambient light level sensing system, so that the projector automatically switches between modes (i.e. without any user input), although there may be manual override in addition to any automatic control.

Where the trigger signal is generated by an ambient light level sensing system, the projector 300 (and hence the aperture actuator 308) may be arranged to switch between modes based on a comparison of the received signal against one or more thresholds. For example, where there are two modes of operation (corresponding to two different aperture sizes), the projector may switch modes based on comparison of the received signal to a pre-defined threshold level. This may be a high ambient light level threshold, which triggers a move to the 'day' mode (i.e. the mode with the larger aperture size) if the light level is above the threshold. Alternatively, it may be a low ambient light level threshold, which triggers a move to the 'night' mode (i.e. the mode with the smaller aperture size) if the light level is below the threshold. In some examples both thresholds may be used, e.g. if in the day mode, the projector may only switch to the night mode if the input signal falls below a low threshold and if in the night mode, the projector may only switch to the day mode if the input signal is above a high threshold. Where there are more than two modes of operation, two or more thresholds may be used.

By using the apparatus and methods described herein, the geometry of the aperture in the projector assembly (which may be part of a head-up or head-worn display) can be varied to improve contrast or luminance whilst ensuring other elements of performance (such as resolution and uniformity of the image) are preserved.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

The invention claimed is:

1. A projector for use in a head-up or head-worn display, the projector comprising:
    a display source;
    an output screen;
    a variable aperture assembly positioned on an optical axis between the display source and the output screen and wherein the variable aperture assembly is adjustable to change a physical or an effective geometry of an aperture that is aligned with the optical axis; and
    an aperture actuator mechanism coupled to the variable aperture assembly, the aperture actuator mechanism configured to (i) change the effective geometry of the variable aperture assembly by moving the variable aperture assembly along the optical axis, and (ii) change the physical geometry of the variable aperture assembly by a lateral motion or a rotation of at least a portion of the variable aperture assembly with respect to the optical axis.

2. The projector according to claim 1, wherein the physical geometry of the aperture comprises a size of the aperture.

3. The projector according to claim 1, wherein the physical geometry of the aperture comprises a shape of the aperture.

4. The projector according to claim 1, wherein the variable aperture assembly comprises a plate with a plurality of apertures of different geometries in the plate, and wherein the aperture that is aligned with the optical axis can be any one of the plurality of apertures.

5. The projector according to claim 4, wherein the plate comprises two apertures of different sizes.

6. The projector according to claim 4, wherein the plate comprises three apertures of different sizes.

7. The projector according to claim 1, wherein:
    the variable aperture assembly comprises a plate with a plurality of apertures of different geometries in the plate; and
    the aperture actuator mechanism is operable to move the plate between two or more pre-set positions, wherein in each pre-set position a different one of the plurality of apertures is aligned with the optical axis.

8. The projector according to claim 7, wherein the motion is a lateral motion.

9. The projector according to claim 7, wherein the motion is a rotation.

10. The projector according to claim 1, wherein the variable aperture assembly comprises a plate having an opening and a movable member, and wherein the aperture actuator mechanism is operable to move the movable member relative to the plate, wherein moving the movable member changes the effective geometry of the aperture that is aligned with the optical axis.

11. The projector according to claim 1, wherein the variable aperture assembly comprises a plate with a variable geometry aperture in the plate.

12. The projector according to claim 11, wherein the aperture actuator mechanism is operable to change the geometry of the variable geometry aperture.

13. The projector according to claim 1, having a first mode of operation wherein the variable aperture assembly is adjusted to a first aperture size and a second mode of operation wherein the variable aperture assembly is adjusted to a second aperture size and wherein the first aperture size is smaller than the second aperture size.

14. The projector according to claim 13, wherein the projector is operable to switch between the first mode and the second mode of operation in response to an input signal.

15. The projector according to claim 14, wherein the input signal is received from a switch or button.

16. The projector according to claim 14, wherein the input signal is received from an ambient light level sensing system.

17. The projector according to claim 16, wherein the projector is operable to switch to the first mode of operation in response to an input signal indicating an ambient light level below a first pre-defined threshold.

18. The projector according to claim 16, wherein the projector is operable to switch to the second mode of operation in response to an input signal indicating an ambient light level above a second pre-defined threshold.

19. A head-up display comprising the projector according to claim 1.

20. A head-worn display comprising the projector according to claim 1.

21. A method of operating a projector for use in a head-up or head-worn display, the projector comprising a display source, an output screen, a variable aperture assembly positioned on an optical axis between the display source and the output screen, and an aperture actuator mechanism coupled to the variable aperture assembly, the method comprising:
    receiving an input signal; and
    adjusting, based on the input signal, the variable aperture assembly to change a physical or an effective geometry of an aperture that is aligned with the optical axis,
    wherein the variable aperture assembly is adjustable to change a physical or an effective geometry of an aperture that is aligned with the optical axis, and
    wherein the aperture actuator mechanism is configured to (i) change the effective geometry of the variable aperture assembly by moving the variable aperture assembly along the optical axis, and (ii) change the physical geometry of the variable aperture assembly by a lateral motion or a rotation of at least a portion of the variable aperture assembly with respect to the optical axis.

22. The method according to claim 21, wherein the input signal is an ambient light level, and wherein adjusting, based on the input signal, the variable aperture assembly to change the geometry of an aperture that is aligned with the optical axis, comprises:
    comparing the input signal to one or more pre-defined thresholds; and
    adjusting, based on the comparison, the variable aperture assembly to change the geometry of an aperture that is aligned with the optical axis.

* * * * *